United States Patent [19]
Chen et al.

[11] Patent Number: 6,068,809
[45] Date of Patent: May 30, 2000

[54] METHOD OF INJECTION MOLDING ELEMENTS SUCH AS SEMICONDUCTOR ELEMENTS

[75] Inventors: Eugene Chen; Hohn Jong Hsiung, both of Taipei; Kuang Hann Lin, Yung-Ho, all of Taiwan; Wing Lun Wong, Kowloon, The Hong Kong Special Administrative Region of the People's Republic of China; Boon Meng Chan, Penang, Malaysia

[73] Assignee: General Semiconductor, Inc., Melville, N.Y.

[21] Appl. No.: 08/900,651

[22] Filed: Jul. 25, 1997

Related U.S. Application Data

[62] Division of application No. 08/580,070, Dec. 20, 1995, Pat. No. 5,698,242.

[51] Int. Cl.⁷ .......................... B29C 45/02; B29C 45/18; B29C 45/53
[52] U.S. Cl. .................... 264/328.1; 264/328.4; 264/328.8; 425/544; 425/561
[58] Field of Search .................. 264/328.1, 328.4, 264/297.2, 297.3, 328.8; 425/562, 564, 572, 544, 557, 561, 588, 585, 129.1

[56] References Cited

U.S. PATENT DOCUMENTS

| | | | |
|---|---|---|---|
| 2,344,176 | 3/1944 | Shaw | 264/297.2 |
| 2,460,964 | 2/1949 | Adair et al. | 264/328.4 |
| 2,469,342 | 5/1949 | Richardson | 264/328.4 |
| 2,479,383 | 8/1949 | MacMillin | 425/543 |
| 3,561,047 | 2/1971 | McInnis | 425/562 |
| 3,609,817 | 10/1971 | Deerberg et al. | 425/543 |
| 4,307,057 | 12/1981 | Hettinga | 264/328.11 |
| 4,611,983 | 9/1986 | Bielfeldt | 264/328.4 |
| 4,690,629 | 9/1987 | Horikawa | 264/328.11 |
| 4,996,170 | 2/1991 | Baird | 264/272.17 |
| 5,407,505 | 4/1995 | Groenewegen et al. | 264/328.4 |
| 5,698,242 | 12/1997 | Chen et al. | 425/544 |

FOREIGN PATENT DOCUMENTS

| | | | |
|---|---|---|---|
| 59-218736 | 12/1984 | Japan | 425/129.1 |
| 60-1835 | 1/1985 | Japan | 425/129.1 |
| 61-114830 | 6/1986 | Japan | 425/129.1 |

*Primary Examiner*—Jill L. Heitbrink

[57] ABSTRACT

In a method of injection molding elements, a first step is to charge a molding compound into an injection nozzle via a side hole defined in the nozzle under the control of a mini-plunger which is selectively reciprocally movable within a bore of the injection nozzle. In a second step, the mini-plunger is reciprocally moved in the bore of the nozzle for injecting substantially the entire molding compound in the bore of the injection nozzle into at least one cavity of a mold via a separate gate passage defined in the mold. Each gate passage is a narrow capillary aperture that connects the bore of the injection nozzle with a different one of the at least one cavity of the mold. In a third step, the nozzle and the mold are separated after the molding compound in the gate passage is cured but before the molding compound in the at least one cavity of the mold is cured. In a fourth step the molded element is removed from the at least one cavity of the mold once the molding compound therein is cured.

4 Claims, 6 Drawing Sheets

METHOD OF INJECTION MOLDING ELEMENTS SUCH AS SEMICONDUCTOR ELEMENTS

This application is a division of application Ser. No. 08/580,070, filed Dec. 20, 1995, U.S. Pat. No. 5,698,242.

FIELD OF THE INVENTION

The present invention relates to an injection molding method and apparatus for the production of various elements, such as semiconductor elements, and, more particularly, to a method and apparatus which facilitates an automatic production of various elements, such as semiconductor elements, and allows high efficient use of a molding material and reduction in injection molding time.

BACKGROUND OF THE INVENTION

In prior art injection molding technology, solid molding compounds are used to fill a cavity of a mold. More particularly, a solid molding compound is compressed at a pre-heated temperature to form a compound melt before introducing the compound melt under pressure via runners into a cavity defined in a mold. After the molding compound is cured within the cavity of the mold to form an element, the cured molding compound is separated from the cavity of the mold. However, with such prior art technique, the molding compound has to be melted before the melt is introduced into the cavity of the mold through the runners. Thus, the molding process is relatively time consuming. Still further, the molding compound forms a residue in the mold, such as in the runners or molding pot, after the molding process is complete. This results in an increased expense for cleaning the mold.

Figure 1:
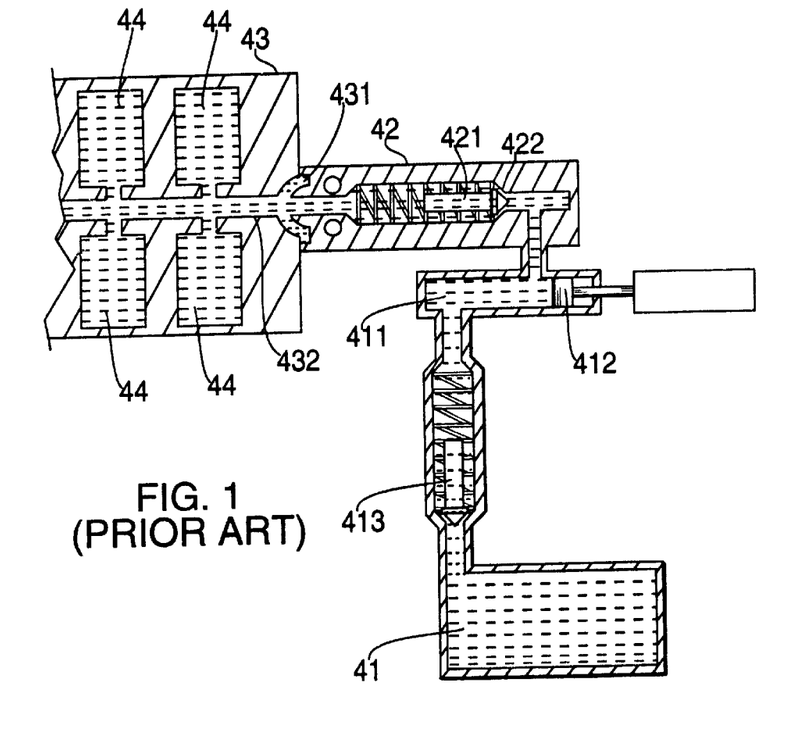
FIG. 1 is schematic view of a first prior art molding apparatus.

U.S. Pat. No. 3,608,150 (L. Laufer et al.), issued on Sep. 28, 1971, discloses a molding process utilizing a liquid molding compound (feeding material). FIG. 1 (labeled Prior Art) herein shows a structure for the molding apparatus of the L. Laufer et al. patent. The molding apparatus of FIG. 1 comprises a storage tank 41, an injection cylinder 411 with a reciprocally movable piston 412 therein and a check valve 413, a nozzle housing 42 defining a bore 422 wherein a spring-loaded check valve 421 is positioned, and a mold 43 defining a first sprue-like runner 431 and a second runner 432 leading to a plurality of mold cavities 44. More particularly, a liquid molding compound is stored in the storage tank 41 and is introduced into the injection cylinder 411 under the control of a spring-loaded check valve 413 when the piston 412 is moved to the right in FIG. 1. Concurrently with the piston 412 moving towards the right in injection cylinder 411, the liquid molding compound in the bore 422 of the nozzle housing 42 is prevented from returning to the injection nozzle 411 by the spring-loaded check valve 421. The liquid compound is periodically introduced into a mold 43 via the nozzle housing 42 and the check valve 421 by moving the piston 412 in the injection cylinder 411 to the left after the injection cylinder 411 has been filled. A concave first runner 431 is disposed at a convex coupling portion of the nozzle housing 42 and the mold 43 to receive a charge of the liquid molding compound. A rear end of the first runner 431 is connected to a second runner 432. The liquid molding compound is charged into a plurality of cavities 44 of the mold 43 via the second runner 432. In this prior art molding apparatus, the liquid molding compound must pass through the first and second runners 431 and 432 in order to reach the plurality of cavities 44 of the mold 43. This causes the formation of a residue within the runners 431 and 432. As a result, a shortcoming of this prior art process is that the residue remaining in the runners 431 and 432 is not fully used for molding the elements, and, in turn, the molding compound is not efficiently used. Still further, since the mold compound passes through the check valve 421, around the spring therein, and eventually cures, the reliability of the spring and then the check valve is considerably affected. Additionally, since injection pressure is developed from a single cylinder 411, a pressure variation occurs in different ones of the cavities 44 as the molding compound flows through the runner 432.

Figure 2:
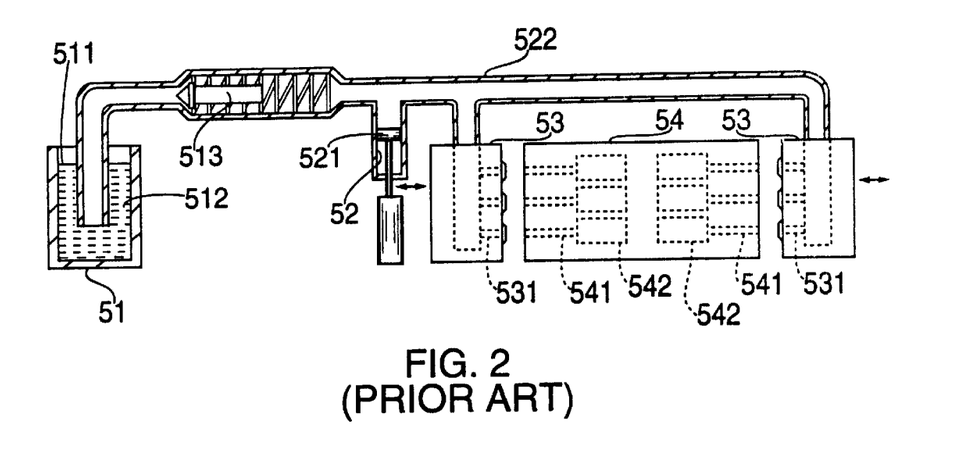
FIG. 2 is schematic view of a second prior art molding apparatus.

U.S. Pat. No. 4,996,170 (J. Baird), issued on Feb. 26, 1991, relates to a molding process for encapsulating semiconductor devices using a thixotropic compound. FIG. 2 herein (labeled Prior Art), shows a structure for the molding apparatus of the J. Baird patent. The molding apparatus of FIG. 2 comprises a feed pot 51, a check valve 513, a transfer cylinder 52 including a reciprocative piston 521, manifolds 53, and a mold 54. The feed pot 51 stores a thixotropic compound 512 used for the molding process, and includes a follower plate 511 to prevent exposure of the compound 512 to the surrounding atmosphere. The transfer cylinder 52 includes the reciprocative piston 521 which is used to extract the thixotropic compound from the feed pot 51 via a check valve 513 in a feed tube 522. The piston 521 also functions to force the thixotropic compound to the manifolds 53 via the feed tube 522 once the manifolds 53 are in contact with the mold 54. More particularly, feed runners 531 in the manifolds are aligned with, and are sealed to, subrunners 541 in the mold 54 so that the pressurized thixotropic compound in the feed runners 531 of the manifolds are charged into the subrunners 541 and associated cavities 542 in the mold 54. After the thixotropic compound is charged into the cavities 542 of the mold 54, the thixotropic compound must be cured before the manifolds 53 and the mold 54 are separated. Thus, it takes a longer time for each compound charging step because of the waiting time for the thixotropic compound to be cured in the mold 54. Still further, in such prior art process, a multiple charging of the thixotropic compound is used, but a residue of the thixotropic compound cannot be avoided as a result of the thixotropic compound being passed through the subrunners 541 where the compound remains. Although, this prior art molding process uses multiple injection points in the manifolds 53, pressure variations can occur as the molding compound flows through the feed tube 522 and the manifolds 53.

It is desirable to provide a molding apparatus for the production of various elements, such as semiconductor elements, comprising a mold defining one or more mold cavities therein, and an injection nozzle, where the injection nozzle can be separated from the mold prior to the curing of an injected mold compound in the one or more cavities. Still further, it is desirable to provide a molding apparatus that facilitates automatic production of various elements, such as semiconductor elements, and allows high efficient use of a molding material by reducing any residue in the nozzle or runners in the mold to a minimum.

SUMMARY OF THE INVENTION

The present invention is directed to an injection molding method and apparatus for the production of various elements, such as semiconductor elements, which saves time in the molding process and provides a fast automatic molding process while reducing molding material residue.

Viewed from one aspect, the present invention is directed to a method for injection molding of various elements, such as semiconductor elements. The method comprises a first step of charging a molding compound into an injection nozzle via a side hole defined in the injection nozzle under the control of a mini-plunger which is selectively reciprocally movable within a bore of the injection nozzle. In a second step, the mini-plunger is reciprocally moved in the bore of the nozzle for injecting the molding compound into at least one cavity of a mold via a separate gate passage defined in the mold. Each gate passage is a narrow capillary aperture that connects the bore of the injection nozzle with a separate cavity of the mold. In a third step, the nozzle and the mold are separated after the molding compound in each gate passage is cured but before the molding compound in the at least one cavity of the mold is cured. In a fourth step, the molded element is removed from the at least one cavity of the mold.

Viewed from another aspect, the present invention is directed to apparatus for the injection molding of various elements, such as semiconductor elements, comprising an injection nozzle, a mini-plunger, and a mold. The injection nozzle defines (a) a first bore, (b) a second bore extending longitudinally from the first bore where the second bore is of a narrower diameter than that of the first bore, and (c) a side hole connecting the first bore with a source of a molding compound adjacent the connection of the first bore with the second bore. The mini-plunger comprises an outer plunger, and an inner plunger. The outer plunger is selectively reciprocally movable in the first bore, and in its extended position contacts and seals the side hole. When the outer plunger is retracted, the side hole is exposed to the first bore for permitting the molding compound to enter the first bore. As the outer plunger is returned to its starting position, the molding compound is charged down through the first and the second bores and into the mold. The inner plunger is reciprocally and selectively movable within both a central aperture defined by the outer plunger and within a second bore of the nozzle. The mold is placed in contact with the nozzle and defines at least one cavity in the shape of elements to be molded which is in communication with the nozzle via a separate gate passage. The at least one cavity in the mold is charged with the molding compound when the outer plunger is returned to its starting position and the inner plunger is then extended through the full length of the second bore to substantially purge the nozzle of any molding material.

Viewed from still another aspect, the present invention is directed to apparatus for the injection molding of various elements, such as semiconductor elements. The apparatus comprises a plurality of N injection nozzles, a plurality of N mini-plungers associated with a separate one of the plurality of N nozzles, and a plurality of N molds defining a plurality of M cavities, where M≧N. Each nozzle of the plurality of N injection nozzles, defines (a) a first bore, (b) a second bore extending longitudinally from the first bore where the second bore is of a narrower diameter than that of the first- bore, and (c) a side hole connecting the first bore with a source of a molding compound adjacent the connection of the first bore with the second bore. Each mini-plunger of the plurality of N mini-plungers comprises an outer plunger, and an inner plunger. The outer plunger is selectively movable in the first bore, and in its extended position contacts and seals the side hole. When the outer plunger is reciprocally moved in a first direction, the side hole is exposed to the first bore for permitting the molding compound to enter the second bore. When the outer plunger is reciprocally moved in a second direction to its starting position while the inner plunger is retracted, the outer plunger charges the molding compound down through the second bore. The inner plunger is reciprocally and selectively movable within both a central aperture defined in the outer plunger and within the second bore of the nozzle. Each mold is placed in contact with a separate one of the plurality of N nozzles. Each mold defines at least one cavity, where each cavity is in communication with one of the plurality of N nozzles via a separate gate passage. The at least one cavity in each mold is charged with the molding compound when the outer plunger of the associated nozzle is reciprocally moved in a second direction to its starting position, and the inner plunger is reciprocally moved to extend through the full length of the second bore and minimize any molding compound residue in the nozzle.

The invention will be better understood from the following more detailed description taken with the accompanying drawings and claims.

DETAILED DESCRIPTION

It is to be understood that corresponding elements performing the same function in each of the figures have been given the same designation number.

Figure 3:
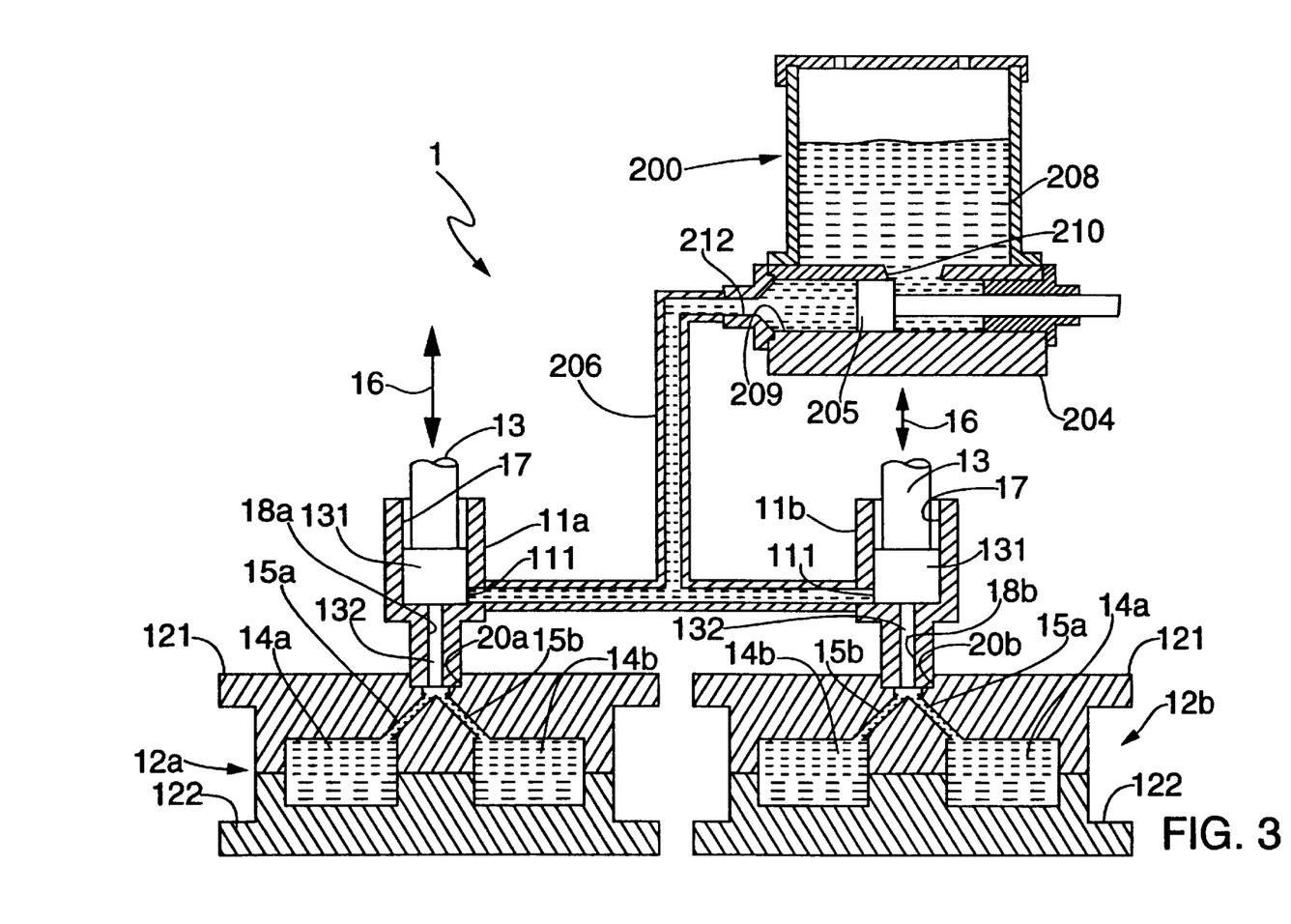
FIG. 3 is a schematic view of a molding apparatus for concurrently charging multiple nozzles from a molding compound storage tank and concurrently injecting molding compound into multiple cavities from each nozzle in accordance with the present invention.

Referring now to FIG. 3, there is shown a schematic view of a molding apparatus 1 for concurrently charging multiple nozzles 11a and 11b from a molding compound storage tank 200 and concurrently injecting molding compound into multiple cavities 14a and 14b from each nozzle in accordance with the present invention which avoids the use of runners and subrunners in a mold as is found in prior art molding apparatus. Apparatus 1 is useful for producing various elements such as semiconductor elements. The molding apparatus 1 comprises a storage tank 200 for holding a supply of a molding compound 208, an injection syringe 204 integrated to the storage tank 200 by an aperture 210 and defining an outlet port 212 and a central bore 209 wherein a piston 205 is reciprocally movable, a first and second nozzle 11a and 11b, and a feed tube 206 coupling a side hole defined in each of the first and second nozzles 11a and 11b to the outlet port 212 of the injection syringe 204. The first and second nozzles 11a and 11b are shown in direct contact with first and second molds 12a and 12b, respectively, which each define first and second cavities 14a and 14b and relatively short and narrow gate passages 15a and 15b therein. Each of the first and second nozzles 11a and 11b comprises a mini-plunger 13 that comprises an outer plunger 131 that is reciprocally and selectively movable in a bore 17 defined by the nozzle 11a or 11b, and a smaller diameter inner plunger 132 that is selectively and reciprocally movable in a second bore 18 defined by the nozzle 11a or 11b and a central bore (not shown) within the outer plunger 131. The mini-plunger 13 is used to provide a pressure to control an injection of a molding compound into the mold 12a or 12b. Each of the first and second nozzles 11a and 11b further defines the side hole 111 adjacent the connection of the first and second bores 17 and 18, where the side hole 111 is adapted to supply the associated nozzle 11a or 11b with the molding compound 208 under a low pressure from the storage tank 200 to the nozzles 11a and 11b by the piston 205 inside the injection syringe 204 via the feed tube 206. The mini-plunger 13 in each of the nozzles 11a and 11b is reciprocally movable in the directions of arrows 16 in the bores 17 and 18, and serves as a switch for controlling the communication of the molding compound with the nozzle 11a or 11b and for adjusting the amount of molding compound used, as is explained in greater detail hereinafter. Still further, each of the outer and inner plungers 131 and 132 are separately reciprocally movable in the directions of arrows 16 under the control of separate actuators (not shown). The cavities 14a and 14b defined in the molds 12a and 12b are provided within an upper mold 121 and a lower mold 122 of the mold 12a or 12b which can be separated. The cavities 14a and 14b in the mold 12a connect with an end of the second bore 18a in the nozzle 11a that is connected to the mold 12a via the gate passages 15a and 15b. The nozzle 11a is selectively connected to the mold 12a by inserting the nozzle 11a into a substantially tight-fitting cylindrical depression 20a defined in an outer surface of the mold 12a in the area of one end of the relatively short and narrow gate passage 15a and 15b. Similarly, the cavities 14a and 14b in the mold 12b connect with an end of the second bore 18b in the nozzle 11b that is connected to the mold 12b via the gate passages 15a and 15b. The nozzle 11b is selectively connected to the mold 12b by inserting the nozzle 11b into a substantially tight-fitting cylindrical depression 20b defined in an outer surface of the mold 12b in the area of one end of the relatively short and narrow gate passage 15a and 15b. The operation of the molding apparatus 1 in filling each of the cavities 14a and 14b of the molds 12a and 12b by the nozzles 11a and 11b, respectively, from the storage tank 200 corresponds to that to be described hereinafter for FIGS. 4–10.

Figure 4:
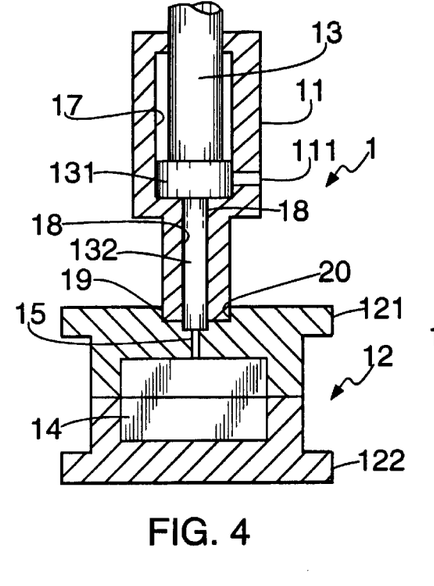
FIGS. 4–10 show sequential molding and control processing steps for injecting a molding compound by a mini-plunger into a single cavity in a mold in the apparatus of FIG. 3.

Referring now to FIGS. 4–10, there is shown a molding and control sequence for injecting a molding compound by a mini-plunger 13 into a single cavity 14, instead of multiple cavities 14, in the apparatus 1 of FIG. 3. Before the molding compound is charged into the nozzle 11, the mold 12 and the nozzle 11 are separated (not shown) and the mold 12 is cleaned if necessary. Referring now to FIG. 4, when the charging process of the mold 12 is to be performed, the mold 12 is closed (i.e., the upper mold 121 and the lower mold 122 are placed together to define the cavity 14), and the nozzle 11 is connected to the mold 12 in the cylindrical depression 20 defined in the mold 12. At this time, an end of the inner plunger 132 is disposed in the second bore 18 and is located flush with an end 20 of the nozzle 11. More particularly, at a start position, the outer plunger 131 is in contact with and seals the side hole 111, and the inner plunger 132 is extended outside of the outer plunger 131 in first bore 18 and into the second bore 18 so that its end 19 is flush with the end 20 of the nozzle 11.

Figure 5:
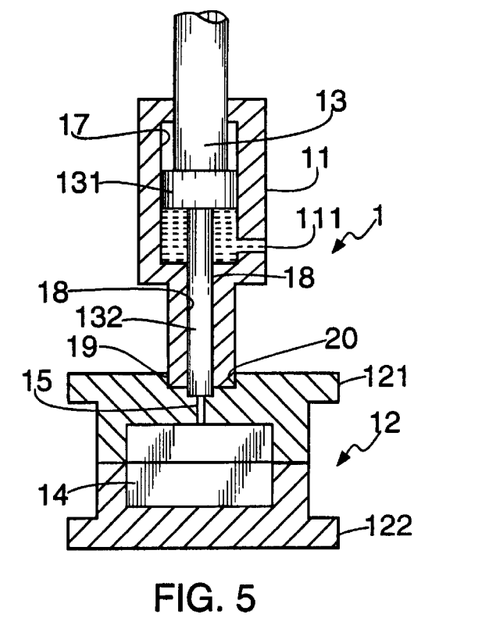

Referring now to FIG. 5, there is shown that when the outer plunger 131 of the mini-plunger 13 in the nozzle 11 is moved upwards in the first bore 17, the outer plunger 131 is separated from the side hole 111 and molding compound is charged into the first bore 17 of nozzle 11 via the side hold 111 under a relatively low filling pressure developed by the movement of the piston 205 (shown in FIG. 3) inside the injection syringe 204 (shown in FIG. 3) integrated with the storage tank 200 (shown in FIG. 3). At this time the inner plunger 132 of the mini-plunger 13 is maintained in the second bore 18, and seals the second bore 18 to prevent the molding compound from entering the mold 12 as it is charged into the first bore 17. It is to be understood that the process described for FIGS. 4 and 5 can be performed prior to the nozzle 11 being brought into contact with the mold 12.

Figure 6:
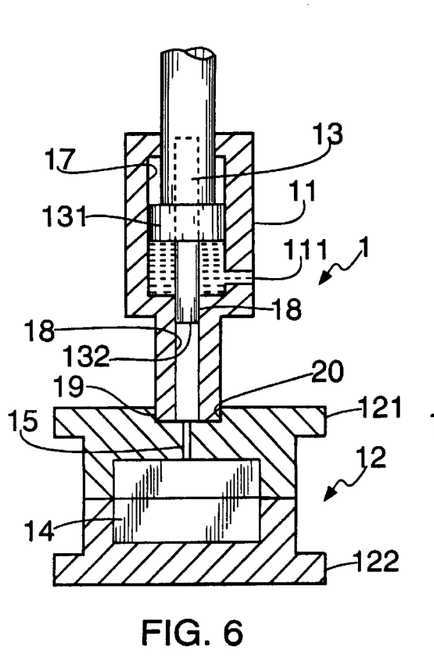
Figure 7:
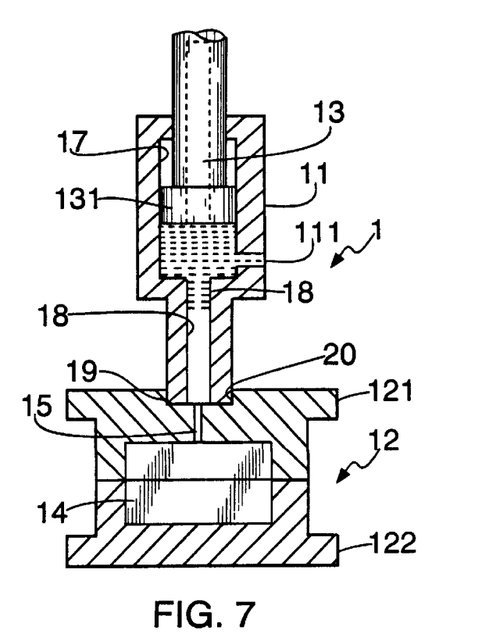

Referring now to FIGS. 6 and 7, FIG. 6 shows the inner plunger 132 being selectively raised in the second bore 18. FIG. 7 shows the inner plunger 132 being further raised until an opening exists jointing the first bore 18 and the second bore 17. The raising of the inner plunger 132 permits more of the molding material to enter the first bore 18 and the second bore 17 from the side hole 111.

Figure 8:
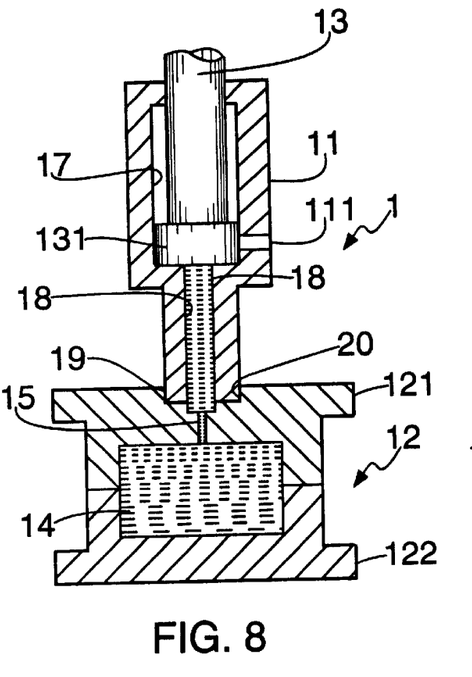
Figure 9:
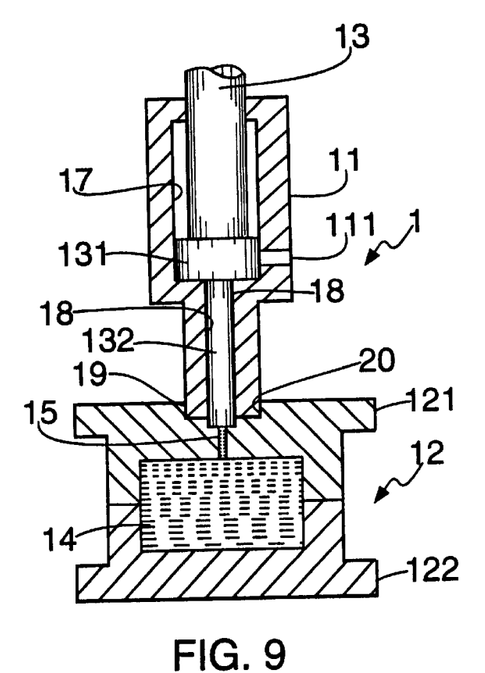
Figure 10:
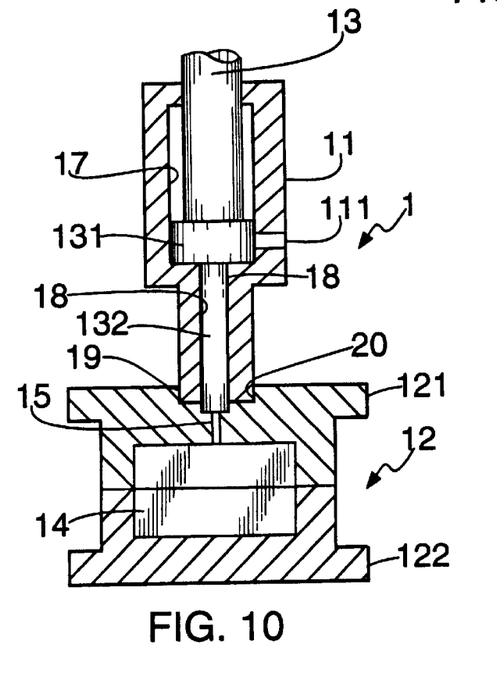

Referring now to FIGS. 8, 9, and 10, there is shown a sequence of injecting the molding material into the mold 12. As is shown in FIG. 8, the outer plunger 131 is first pushed down to seal the side hole 111 and charge the molding material in the first bore 17 into the cavity 14 of the mold 12 via the second bore 18 and a gate passage 15 in the mold 12. As is shown in FIG. 9, the inner plunger 132 is then selectively moved downwards into the bore 18 to effect a further injecting pressure of the molding compound from the nozzle 11 into the mold cavity 14. After the molding process is completed, the outer plunger 131 again contacts and seals the side hole 111. A second effect of the inner plunger 132 is to purge out any molding compound from the nozzle 11 into the mold cavity 14, and to clean up the tip of the nozzle 11 so as to reduce molding material residue in the nozzle 11 to a minimum. As is shown in FIG. 10, the nozzle 11 is returned to its start state, as is also shown in FIG. 4, for preparing for the next injection molding process.

Advantages of the molding apparatus and process in accordance with the present invention are as follows. The gate passage 15, being a relatively short and narrow capillary aperture, as compared to the size of the mold cavity 14, permits the molding material in the gate passage 15 to solidify very quickly and seal the mold cavity 14 before the molding material in the mold cavity 14 cures. Therefore, after the molding compound is cured or solidified within the gate passage 15, the nozzle 11 and the mold 12 can be immediately separated without waiting for the molding compound in the mold cavity 14 to be cured. Thus, the nozzle 11 can be used again for charging another mold 12 while the molding material in a previously charged mold 12 cures. Due to the fact that the mold 12 and the nozzle 11 can be separated after the molding compound within the gate passage 15 is cured, the time of injection molding is reduced from that found in prior art injection molding techniques. Still further, since the mold 12 and the nozzle 11 are separated before the molding compound in the mold cavity 14 is fully cured, the effect of heat transfer can be lowered so as to avoid solidification of any molding compound that may remain within the nozzle 11. Still further, there is no feedback material or contamination of the nozzle 11, and molding material packaging pressure in the mold cavity 14 is maintained because the molding material in the relatively short and narrow capillary gate passage 15 has already cured.

Figure 11:
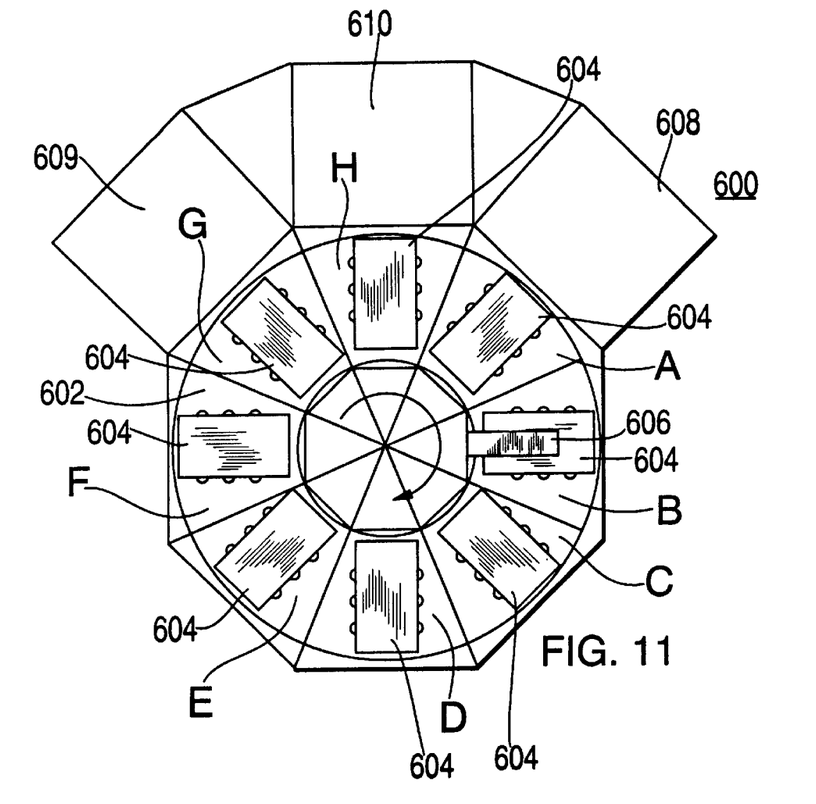
FIGS. 11 and 12 show a top view and a side view, respectively, of an automatic processing mechanism for the concurrent production of elements using multiple apparatus of FIG. 3.
Figure 12:
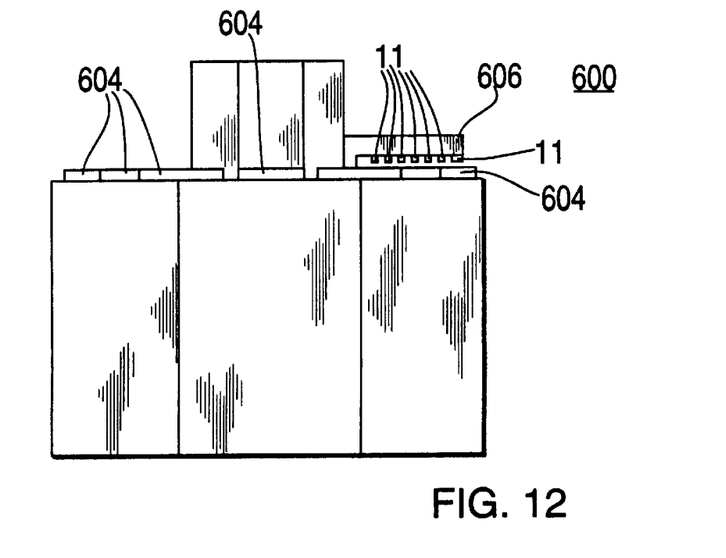

Referring now to FIGS. 11 and 12, there is shown a top view and a side view, respectively, of an automatic processing mechanism 600 for the production of various elements, such as semiconductor elements, using multiple apparatus 1 of FIG. 3 in accordance with the present invention. The mechanism 600 comprises a rotationally movable round table 602 which is divided into a plurality of stations (of which 8 stations designated A–H are shown). It is to be understood that the table 602 can be divided into more or less than eight stations and still fall within the scope of the present invention.

Station A is a loading station where a plurality of M cavities 14 (where only one of the cavities is shown in FIGS. 4–10) for the elements to be molded in a plurality of N molds 604 (where only one of the molds is shown in FIGS. 4–10) are loaded onto the table 602 in N molds from a table or loading mechanism 608. At station B, a plurality of N nozzles 11 (shown only in FIG. 12) are fixed in an upper arm 606. The plurality of N nozzles 11 match the location of N cylindrical depression or injection ports 20 (shown in FIGS. 3–10) which are connected to the associated ones of the M cavities 14 via M gate passages 15 (shown only in FIGS. 3–10) in the plurality of N molds 604 on the table 602. Thus, at station B, a plurality of M cavities 14 (not shown) can be charged simultaneously to produce the elements. After the mold cavities 14 (shown only in FIGS. 3–10) are charged with the molding compound and the material in the gate passages 15 (shown only in FIGS. 3–10) are cured, the molds 12 in the plurality of N molds 604 are separated from the nozzles 11 and the molds 604 are moved by the rotation of the table 602 to stations C–F in sequence. At stations C–F, the molding material in the plurality of M cavities 14 become cured. At stations G and H, the elements are unloaded onto a platform or by an unloading mechanism 609, and the molds 12 are then cleaned, respectively, at a table or by a cleaning mechanism 610. At this time, the molding process is completed.

It is to be understood that with the molding process, after the nozzles 11 are charged with the molding compound as shown in FIG. 7, a very short time period is required to complete the molding process as shown in FIGS. 8 and 9 and a curing of the molding material in the gate passages 15 (shown only in FIGS. 3–10). The molds 12 are then shifted to the stations C–F during which time the molding material in the mold cavities 14 are allowed to fully cure. Therefore, it is not necessary to wait for a total curing of the molding compound within the mold cavities 14. As a result, the rate of the molding process is greatly improved. In general, a processing rate of around 8–10 seconds is needed with the present molding process as compared with a rate of 60–70 seconds needed with prior art injection molding processes.

After the molding compound in the automatic processing mechanism 600 is charged into the mold cavities 14 by the mini-plungers 13 (shown only in FIGS. 3–10) in the plurality of N nozzles 11, substantially no overflow occurs of any molding compound. This permits a simple cleaning process at station H.

Figure 13:
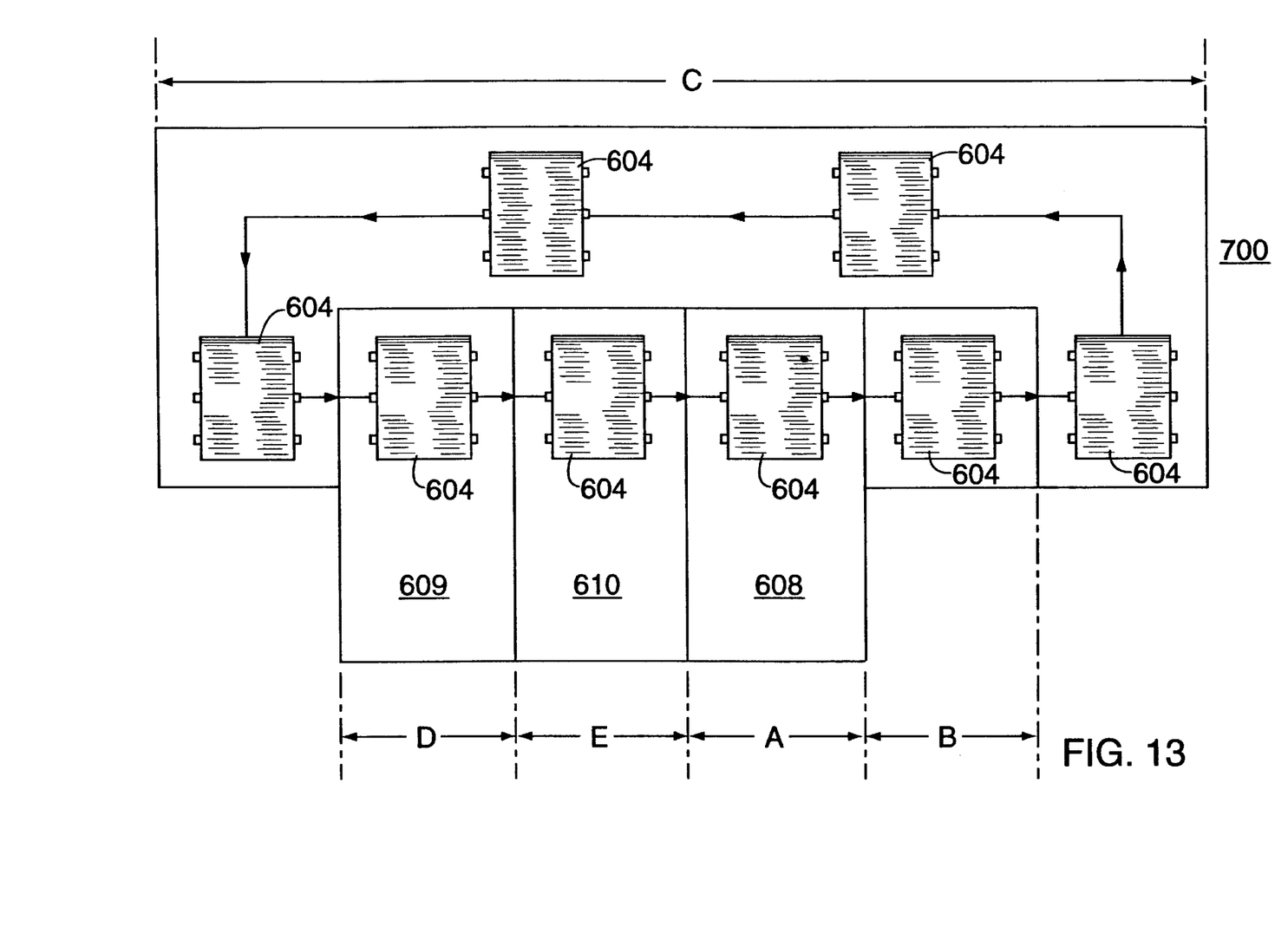
FIG. 13 show a top view of another embodiment of an automatic processing mechanism for the concurrent production of elements using multiple apparatus of FIG. 3.

Referring now to FIG. 13, there is shown a top view of an automatic processing mechanism 700, which is similar to the mechanism 600 of FIGS. 11 and 12, for the concurrent production of various elements, such as semiconductor elements, using multiple apparatus 1 of FIG. 3 in accordance with another embodiment of the present invention. The mechanism 700 demonstrates an in-line arrangement which is divided into a plurality of stations of which five stations designated A, B, C, D, and E are shown. It is to be understood that the mechanism 700 can be divided into more of less than five stations and still fall within the spirit and scope of the present invention.

Station A is a loading station where a plurality of M cavities 14 (shown in FIG. 3) for the elements to be molded in a plurality of N molds 604 are loaded from a table or loading mechanism 608. At station B, a plurality of N nozzles 11 (shown only in FIGS. 3–10) are fixed above the plurality of N molds 604. The plurality of N nozzles 11 match the location of N cylindrical depressions or injection ports 20 (shown only in FIGS. 3–10) which are connected to the associated ones of the M cavities 14 via M gate passages 15 (shown only in FIGS. 3–10). The plurality of M cavities 14 (not shown) are charged simultaneously with a molding compound to fill the cavities 14 and produce the elements to be molded. After the mold cavities 14 are charged with the molding compound and the molding compound material in the gate passages 15 (shown only in FIGS. 3–10) are cured, the plurality of N molds 604 are separated from the nozzles 11 and then shifted to stations C–E in sequence.

At station C, the molding compound material in the plurality of M cavities 14 becomes cured. One flexibility of this embodiment is that station C can accommodate any number, one or more, of molds 604. This can be achieved by adjusting a different transport time inside of station C from that of the other stations A, B, D, and E.

At station D, the elements in the mold 604 are unloaded onto a platform (not shown) by any suitable unloading mechanism 609. At station E the plurality of M cavities 14 are cleaned at a table (not shown) or by a cleaning mechanism 610 for subsequent reuse. At this time, the molding process is complete.

It is to be appreciated and understood that the specific embodiments of the invention described hereinbefore are merely illustrative of the general principles of the invention. Various modifications may be made by those skilled in the art which are consistent with the principles set forth. More particularly, the invention contemplates any configuration, design, and relationship of components which will function in a similar manner, and which will provide the equivalent result. For example, the automatic processing mechanism 600 shown in FIGS. 11 and 12 can comprise any suitable configuration such as an on-line arrangement where the molds 12 are moved in an on-line linear or oblong form which is divided into a plurality of stations rather than in the circular form shown. Still further, the automatic processing mechanism 600 shown in FIGS. 11 and 12 can be adapted to use individual nozzles 11 for individual cavities 14 in the molds 12 as shown in FIG. 4–10, or to use individual nozzles 11 for a plurality of cavities 12 in each of the molds 14 as shown in FIG. 3.

What is claimed is:

1. A method of injection molding elements comprising the steps of:

(a) charging a molding compound into a bore of an injection nozzle via a side hole defined in the injection nozzle under the control of a mini-plunger which is selectively reciprocally movable within the bore of the injection nozzle;

(b) reciprocally moving the mini-plunger in the bore of the nozzle for injecting substantially the entire molding compound in the bore of the injection nozzle into at least one cavity of a mold via a separate gate passage defined in the mold, where each gate passage is a narrow capillary aperture that connects the bore of the injection nozzle with a different one of the at least one cavity of the mold;

(c) separating the nozzle and the mold after the molding compound in the gate passage is cured but before the molding compound in the at least one cavity of the mold is cured; and (d) removing the molded element from the at least one cavity of the mold once the molding compound therein is cured.

2. The method of claim 1 wherein the mini-plunger comprises an outer plunger which is selectively reciprocally movable in a first bore defined in the nozzle, and an inner plunger which is reciprocally and selectively movable within both a central aperture defined in the outer plunger and within a second bore defined in the nozzle which is connected at one end thereof to the mold at one end of each gate passage, and wherein:

in performing step (a), raising the outer plunger of the mini-plunger in the first bore to open the side hole and permit the molding compound to enter the first bore under the control of the outer plunger while the inner plunger remains extended into the full length of the second bore of the nozzle.

3. The method of claim 2 wherein in performing step (b), performing the substeps of:

(b1) reciprocally moving the inner plunger out of the second bore of the nozzle and permitting the molding compound to fill the space in the first bore vacated by the inner plunger and enter the second bore of the nozzle;

(b2) reciprocally moving the outer plunger to charge the at least one cavity of the mold with the molding compound present in the first bore via the second bore of the nozzle and each gate passage; and (b3) reciprocally moving the inner plunger substantially into the full length of the second bore to further charge the molding compound into the at least one cavity of the mold via each gate passage to cause a minimum of mold compound residue to remain in the first and second bores and a tip of the nozzle.

4. A method of injection molding of semiconductor elements comprising the steps of:

(a) charging a molding compound into a first bore of an injection nozzle via a side hole defined in the injection nozzle under the control of a mini-plunger comprising an outer plunger which is selectively reciprocally movable within the first bore of the injection nozzle and an inner plunger which is selectively and reciprocally movable in a central aperture defined in the outer plunger and in a second bore of the injection nozzle extending from an end of the first bore;

(b) reciprocally moving the mini-plunger in the first bore of the nozzle for injecting substantially the entire molding compound in the first bore of the injection nozzle into at least one cavity of a mold via a separate gate passage defined in the mold, where each gate passage is a narrow capillary aperture that connects the first bore of the injection nozzle with a different one of the at least one cavity of the mold;

(c) extending the inner plunger through the second bore to substantially purge the nozzle of any molding compound;

(d) separating the nozzle and the mold after the molding compound in the gate passage is cured but before the molding compound in the at least one cavity of the mold is cured; and (e) removing the molded element from the at least one cavity of the mold once the molding compound therein is cured.

* * * * *